United States Patent Office

2,718,686
Patented Sept. 27, 1955

2,718,686

PROCESS FOR THE MANUFACTURE OF FILTER PORCELAINS

Alfredo Garbati, Bilbao, Spain

No Drawing. Application April 16, 1954,
Serial No. 423,827

Claims priority, application Spain December 22, 1953

2 Claims. (Cl. 25—156)

The present invention relates to a process for the manufacture of porcelains to be used in the elaboration of filters susceptible to adopt divers shapes in compliance with the purpose for which they are designed. Such filters made of a special porcelain being applicable for the filtration of gases, liquids and liquable solids.

These porcelains can serve as filters for different substances and are of such solidity that in use they exclude the possibility of any particles breaking off, which would thus give rise to serious damages of the machines that are supplied with these filters.

The manufacturing process for this porcelain is as follows:

A mixture is prepared having about 85% of quartz and 15% of potassium sodium sulfate.

This mixture, after having passed through a sieve to separate clots that would cause grains during the baking operation, is molded to an appropriate shape by means of a hand rammer, thereby being able to obtain a perfectly molded piece of the required shape and size in accordance with the purpose for which it is designed.

These pieces are first submitted to a drying process in the open air, whereby they acquire a sufficient hardness to enable their manipulation without fear of any damage whatsoever. At this stage they are fired in a kiln where the temperature is raised slowly and gradually up to about 1250 to 1300° C., after which and upon liquation thereof, the flux will perfectly cover all the grains whilst simultaneously bonding them together without obstructing the pores constituted by the grains, thus forming a compact mass and having obtained the piece in question; however, so as to correct any defect shown and above all to assure the distribution of the particles corresponding to the inner and outer surfaces in a perfect manner, these are now enamelled with a conglomerate of sodium silicate obtained by the following components and proportions: silica 60%, soda 15%, potash 15% and lime 10%, submitting same to another baking process at a temperature of about 900 to 950° C. This enamel, applied as a varnish to both surfaces, holds the outer particles together in a most efficient manner and thereby preventing their breaking off. As has already been stated, both the raising as also the lowering of the temperature should be carried out as slowly as possible, so as to prevent a cracking of the enamel which, although devised for a perfect adherence to the mass, could experience a deterioration.

This enamelling process assures, contrary to that of other known processes, a selective permeability of the porcelain, as by means of this process, the obtained product acquires the necessary degree of porosity, so that its use as a filter for all kinds of liquids, gases and liquable solids, is perfect.

The advantages of the filters manufactured by this process reside in that due to their siliceous constitution, they can be dipped into all kinds of caustic, acid and corrosive liquids, achieving thereby a chemical cleaning that is by far more efficient than that of any mechanical means, whereas they can also be placed in a calcining furnace without causing deterioration, thereby ensuring the removal of all the remains of material or weight. The larger proportion of silica, enables abrupt changes of temperature that cannot be achieved with glass filters and which by a transition of one hundred degrees are liable to break.

The great increase of temperature to which they are exposed during their baking process, leads to the liquation of the enamel that covers all the silica grains, and as this operation lasts two hours, this results in that the attack of the enamel on the silica grains leads to the formation of a layer which from the outside towards the inner portion, increases its silica contents, thus permitting a perfect adherence of the enamel to the core sand.

What I claim is:

1. A process for the manufacture of a poreclain filter comprising molding into a desired piece a mixture comprising about 85% quartz particles and about 15% potassium sodium sulfate particles, firing the molded piece at a temperature of about 1250° to 1300° C. until particles of the molded piece flux and form a compact porous mass, and then slowly cooling the piece.

2. The process as defined by claim 1 in which the piece after it is fired is coated with a conglomerate of sodium silicate by applying thereto a mixture of 60% silica, 15% soda, 15% potash and 10% lime and refining it at a temperature of about 900° to 950° C.

References Cited in the file of this patent

UNITED STATES PATENTS

| | | |
|---|---|---|
| 1,991,918 | Pick | Feb. 19, 1935 |
| 2,681,865 | Heine | June 22, 1954 |